United States Patent Office 3,261,296
Patented July 19, 1966

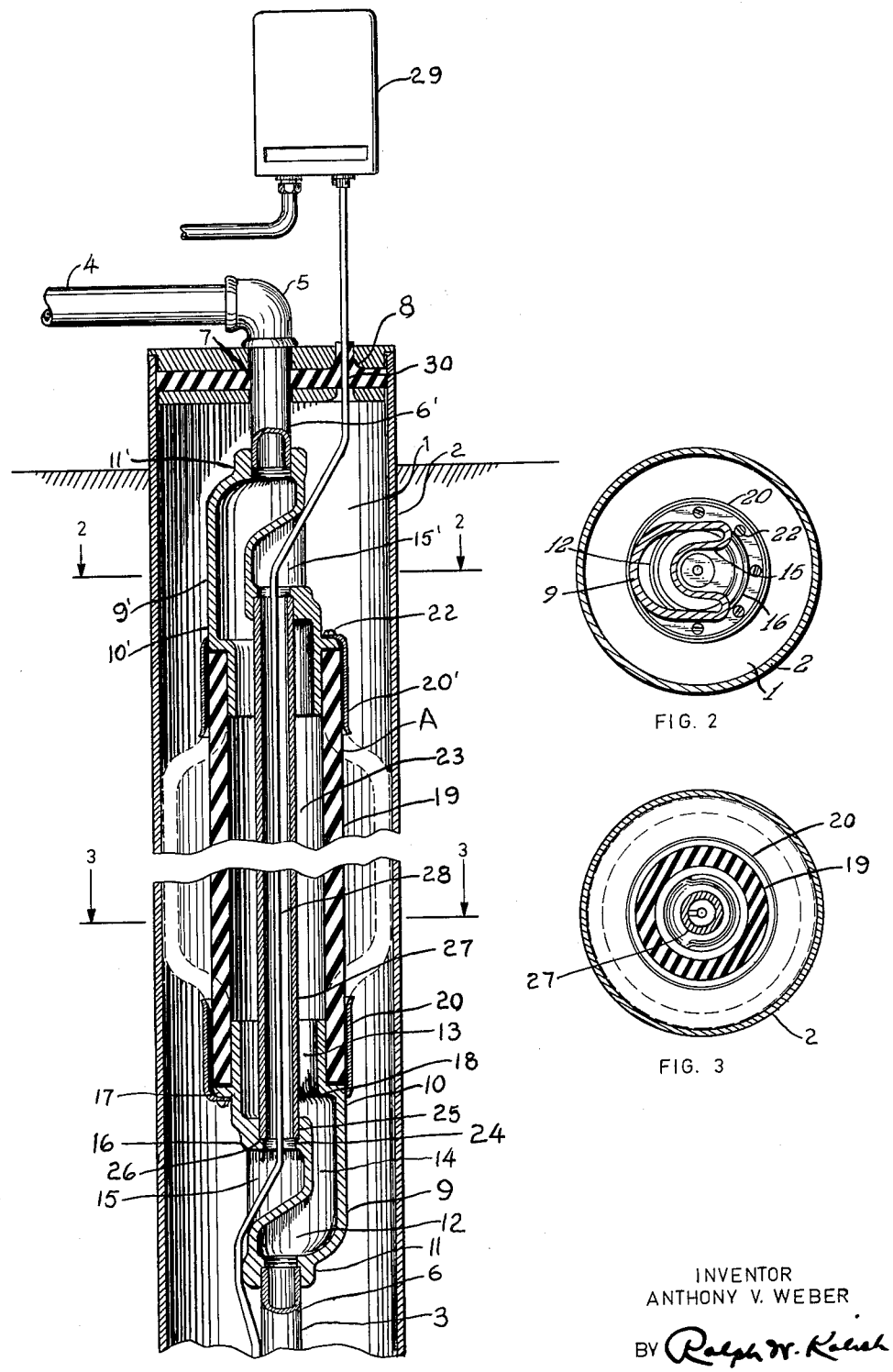

3,261,296
SUBMERSIBLE PUMP CABLE PROTECTION
Anthony V. Weber, St. Louis, Mo., assignor to Weber Industries, Inc., St. Louis, Mo., a corporation of Missouri
Filed Nov. 8, 1965, Ser. No. 506,736
5 Claims. (Cl. 103—87)

This invention relates in general to submersible pumps and, more particularly, to cable protection for such pumps incorporating pulsation or surge dampeners.

It is an object of the present invention to provide a means for protecting against premature wear the drop cable utilized in submersible pumps for connecting the pump motor with an above-ground source of electrical power.

It is a further object of the present invention to provide a cable protection of the type stated adapted particularly for use in a submersible pump incorporating expansible pulsation or surge members wherein the cable is retained against contact with the walls of such chambers so as to prevent wear-producing gripping between same and the wall of the pump casing upon yielding of the chamber under pressure surges.

It is a still further object of the present invention to provide a cable protection of the type stated which will assure of marked longevity of pump operation, thereby preventing inadvertent pump breakdown with attendant costly loss of operation as well as the expense of repair.

It is another object of the present invention to provide a cable protection of the type stated which may be readily incorporated in existing submersible pump systems without extensive modification.

It is a further object of the present invention to provide a cable protection for submersible pump having a pressure chamber, which is economical in production; sturdy in construction having a marked simplicity of parts, and which is fully reliable and durable in usage.

Other objects and details of the present invention will be apparent from the following description when read in connection with the accompanying drawing wherein FIGURE 1 is a fragmentary vertical sectional view of a submersible pump system incorporating a drop cable protection device constructed in accordance with and embodying the present invention.

FIGURE 2 is a transverse horizontal sectional view taken on the line 2—2 of FIGURE 1.

FIGURE 3 is a transverse horizontal sectional view taken on the line 3—3 of FIGURE 1.

Referring now by reference characters to the drawing which illustrates the preferred embodiment of the present invention, A generally designates a pulsation damping apparatus of the type for use with fluid-carrying conduits, being shown herein for exemplary purposes as part of a submersible pump system for disposition within a pump well 1, having a wall or casing 2 which, at its lower end, receives a pump and motor (not shown) and neither of which form a part of the present invention, as the same may be of any well-known, conventional types.

The said pump is connected through a riser, broadly designated 3, to an above-ground service pipe 4, as through an elbow fitting 5. Riser 3, which is co-axial with casing 2, is comprised of lower and upper, vertically spaced apart, sections 6, 6', the latter of which extends through a snug fitting aperture 7 in a casing end closure or seal 8.

Pulsation dampening apparatus A embodies lower and upper manifolds 9, 9', respectively, having walls 10, 10', and threaded end fittings 11, 11', respectively, for snug securement upon the opposed ends of lower and upper riser sections 6, 6', respectively. The opposite ends of said riser sections 6, 6' are in confronting, but spaced apart, relationship, opening toward each other. Said manifolds 9, 9' are of identical construction, being preferably cast from a suitable metal or metal alloy. For purposes of orientation, the ends of manifolds 9, 9' engaged to riser sections 6, 6' are referred to as the outer ends thereof, while the opposite ends are referred to herein as their inner ends. The walls 10, 10' of manifolds 9, 9' are each contoured to provide an inner end, short axial passage 12 for direct communication through the related fitting 11, 11', with the adjacent riser section 6, 6', and with a relatively diametrally increased outer end axial passage 13, of annular cross section. Passages 12, 13 of each manifold 9, 9' are interconnected by an axial offset, transversely C-shaped passage 14, with the intermediate adjacent portion of the related wall 10, 10' being inwardly turned as at 15 to define the bight of said offset passage 14. Passage 14, at its outer ends, opens into the related outer axial passage 13, the inner end of which is determined by a transversely extending wall or baffle 16 which may be considered as forming the base of the proximate bight or recess 15.

Projecting radially outwardly from walls 10, 10' proximate the outer end of the related manifolds 9, 9' is a peripheral flange 17, which merges, and is continuous, on its outer face, with the outer surface of a shoulder 18 formed by the development of offset passages 14.

Received against the outer faces of each flange 17 and associated shoulder 18 are the end surfaces of a cylindrical or tubular, elastic, pressure member 19, fabricated of rubber or like resilient material for yielding under applied pressure; said member 19 being of sleeve character and connecting the ends of manifolds 9, 9' for coordination therewith to constitute pulsation dampener A. Pressure member 19 is firmly maintained in operative position by means of end or retainer caps 20, 20', which include end flanges 21, 21' for securement to the inner faces of flanges 17, as by means of screws 22, or the like, whereby the end portions of said pressure member 19 is tightly sandwiched between the inner faces of caps 20, 20' and the proximate outer face portion of wall 10, 10'. It will be seen that pressure member 19 is disposed in concentricity with casing 1.

Pressure member 19 defines with manifolds 9,9' a pressure or surge absorbing chamber 23. Provided in each transverse wall or baffle 16 is a bore 24, which is preferably counterbored, as at 25, to form an abutment shoulder 26 against which bear the ends of a tube or conduit 27, preferably of rigid, inert material, such as metal, and being presented co-axially of casing 2 by reason of the location of bores 24. Said tube 27 is disposed concentrically of pressure chamber 23 with the wall of pressure member 19 being presented normally radially outwardly thereof.

Extending through tube 27 is a drop cable 28 for connecting the pump and motor of the submersible pump system to an above-ground source of electrical power. Cable 28 may proceed from a conventional motor control box, as indicated at 29, located above the upper end of casing 2, and progress downwardly therefrom through an opening 30, and thence to the open upper end of tube 27 via the bight portion 15 of upper manifold 9'. by passage through bight portion 15, cable 28 is directed into a path substantially coaxial of casing 2. Cable 28 passes downwardly through the said tube for projection through the lower open end thereof, thence radially laterally outwardly and downwardly through bight portion 15 of wall 10 of lower manifold 9 for ultimate connection to the motor.

In view of the foregoing, it will be noted that cable 28 is protected by tube 27 throughout its entire passage within pulsation dampener A, so that no untoward forces may be applied thereon during customary usage of the pump system. Pulsation dampener A operates in the expected manner for absorbing the pressure surges which are normally encountered in the operation of pumping systems, so that with a sudden pressure increase, the pressure member 19 will "give"—that is, yield or bulge outwardly, between end caps 20, 20', in the manner indicated in phantom lines in FIGURE 1, with the ultimate of such bulging causing the said member 19 to be brought into surface contact with the inner face of casing 2. As the pressure of such surges decreases, pressure member 19 will return to its normal position as shown in full lines in FIGURE 1.

By the unique construction of manifolds 9, 9', together with the interconnected tube 27, cable 28 is at all times removed from any possible contact with pressure member 19 or casing and 2, being denied damaging, abrading contact with other surfaces; being thus protected, cable 28 may have a remarkable longevity.

With present constructions, drop cables are customarily led through casing 2 between the inner face thereof and the outwardly presented surface of the expansible sleeve or pressure member 19, whereby, upon expansion of the latter, the cable will be tightly gripped between the said pressure member and the inner face of casing 2. Such constantly received force, with marked abrading effect, ultimately causes a wearing away of the insulation and damage to the cables together with the development of undesired shortcircuiting, resulting in pump stoppage at critical times. Furthermore, such constant subjection of the cables to wearing forces will necessitate frequent cable replacement, with the attendant cost in material, as well as labor and with the cessation of operation of the pump.

The present invention solves a very serious problem which has not been heretofore successfully met, and by the use of this invention, continuity of pump operation is assured.

Furthermore, it is apparent that the present invention could easily be incorporated in existing submersible pump systems, without costly modification.

It should be understood that changes and modifications in the formation, construction, and arrangement and combination of the several parts of the Submersible Pump Cable Protection may be made and substituted for these herein shown and described without departing from the nature and principle of my invention.

Having thus described my invention, what I claim and desire to secure by Letters Patent is:

1. For use in a pump system having a casing, pump motor means provided in said casing, a cable for connecting said pump motor means to a source of electrical power exterior of said casing, and means defining a fluid outlet conduit for direction of flow of fluid from said pump motor means for delivery to a point beyond said casing, said fluid outlet conduit comprising spaced apart, axially aligned first and second sections, the combination of a pulsation dampener comprising first and second manifolds respectively engaged to the confronting ends of the first and second sections of said fluid outlet conduit, a resilient sleeve member extending between, and engaged at its ends to, said first and second manifolds and being spaced from the proximate sections of said fluid conduit, said resilient sleeve together with said manifolds defining an expansible pressure chamber, and of a tubular-forming member presented interiorly of said pressure chamber, extending between, and secured at its ends to, said manifold, said cable passing through said tubular-forming member.

2. For use in a pump system having a casing, pump motor means provided in said casing, a cable for connecting said pump motor means to a source of electrical power exterior of said casing, and fluid outlet conduit means for direction of flow of fluid from said pump motor means for delivery to a point beyond said casing, the combination of a pulsation dampener comprising a pair of spaced apart manifolds provided within said fluid outlet conduit means, each of said manifolds being co-axial with said casing and having aligned openings formed in planes perpendicular to the axis of said casing, a resilient sleeve member extending between and engaged at its ends to said manifolds for defining therewith an expansible pressure chamber, and of a tubular-forming member presented interiorly of said pressure chamber and extending between said manifolds, said tubular-forming member being engaged within said manifold openings, said cable passing through said tubular-forming member.

3. For use in a pump system having a casing, pump motor means provided in said casing, a cable for connecting said pump motor means to a source of electrical power exterior of said casing, and fluid outlet conduit means for direction of flow of fluid from said pump motor means for delivery to a point beyond said casing, the combination of a pulsation dampener comprising a pair of spaced apart manifolds provided within said fluid outlet conduit means, each of said manifolds being co-axial with said casing, each manifold having a continuous wall with a recessed portion, each manifold having a transversely extending wall section adjacent said recess, axially aligned openings provided in said manifold sections for communication between said wall recess and the interior of said manifolds, a resilient sleeve member extending between and engaged at its ends to said manifolds for defining therewith an expansible pressure chamber, and of a tubular-forming member presented interiorly of said pressure chamber and extending between said manifolds, said cable passing through said tubular-forming member, said tubular-forming member being fixed at its ends within said manifold openings whereby the cable extending therethrough passes through the adjacent wall recesses.

4. For use in a pump system having a casing, pump motor means provided in said casing, a cable for connecting said pump motor means to a source of electrical power exterior of said casing, and fluid outlet conduit means for direction of flow of fluid from said pump motor means for delivery to a point beyond said casing, the combination defined in claim 3 and further characterized by said tubular forming member being co-axial of said casing, and with said sleeve in surrounding, but radially spaced, relationship thereto.

5. For use in a pump system having a casing, pump motor means providing in said casing, a cable for connecting said pump motor means to a source of electrical power exterior of said casing, and fluid outlet conduit means for direction of flow of fluid from said pump motor means for delivery to a point beyond said casing, the combination as defined in claim 4, and further characterized by said manifold openings being co-axial with said casing and said tubular forming member.

References Cited by the Examiner

UNITED STATES PATENTS

| | | | |
|---|---|---|---|
| 2,593,316 | 4/1952 | Kraft | 103—223 |
| 2,684,692 | 7/1954 | Hunter et al. | 103—223 X |
| 2,734,462 | 2/1956 | Schaefer | 103—223 |
| 3,020,849 | 2/1962 | Reynolds | 103—87 |
| 3,041,977 | 7/1962 | Boyd | 103—87 |

ROBERT M. WALKER, *Primary Examiner.*